(12) United States Patent
Abbasian et al.

(10) Patent No.: US 11,750,557 B2
(45) Date of Patent: Sep. 5, 2023

(54) NETWORK ADDRESS COMPRESSION FOR ELECTRONIC DEVICES

(71) Applicant: Apple Inc., Cupertino, CA (US)

(72) Inventors: Reza Abbasian, Los Gatos, CA (US); Charles H. Ying, San Mateo, CA (US); Steven J. Falkenburg, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/826,155

(22) Filed: May 26, 2022

(65) Prior Publication Data
US 2022/0286426 A1 Sep. 8, 2022

Related U.S. Application Data

(63) Continuation of application No. 17/199,426, filed on Mar. 11, 2021, now Pat. No. 11,374,901.

(60) Provisional application No. 63/083,015, filed on Sep. 24, 2020.

(51) Int. Cl.
| | | |
|---|---|---|
| *G06F 15/16* | (2006.01) | |
| *H04L 61/301* | (2022.01) | |
| *H04L 101/604* | (2022.01) | |
| *H04L 101/672* | (2022.01) | |

(52) U.S. Cl.
CPC ...... *H04L 61/301* (2013.01); *H04L 2101/604* (2022.05); *H04L 2101/672* (2022.05)

(58) Field of Classification Search
CPC . H04L 61/301; H04L 61/30; H04L 2101/604; H04L 2101/672; H04L 2101/60; G06F 16/9566
See application file for complete search history.

(56) References Cited

U.S. PATENT DOCUMENTS

| | | | |
|---|---|---|---|
| 6,446,133 B1 * | 9/2002 | Tan | H04L 61/301 |
| | | | 709/227 |
| 7,908,317 B2 * | 3/2011 | Musson | G06F 16/955 |
| | | | 709/219 |
| 8,630,200 B2 * | 1/2014 | St. Jean | G06F 16/9566 |
| | | | 370/282 |
| 8,707,442 B1 * | 4/2014 | Lax | G06F 16/9566 |
| | | | 726/26 |
| 9,087,070 B2 * | 7/2015 | Francis | G06F 16/9566 |

(Continued)

FOREIGN PATENT DOCUMENTS

| | | | | |
|---|---|---|---|---|
| CN | 104463156 A | * | 3/2015 | ........... G06K 9/2009 |
| CN | 106406851 A | * | 2/2017 | |

(Continued)

*Primary Examiner* — Richard G Keehn
(74) *Attorney, Agent, or Firm* — BAKERHOSTETLER

(57) ABSTRACT

The subject technology provides an in-place encoding of a network identifier that compresses the network identifier without mapping the network identifier to a another server or service, such as URL shortening service. The network identifier may be compressed using segmented encoding operations that segment the network identifier, and encode the characters of the network identifier using a first set of encoding operations for a first portion of the network identifier and a second set of encoding operations for a second portion of the network identifier. Template encoding may also be provided for network identifiers that conform to a predefined template format.

20 Claims, 6 Drawing Sheets

(56) References Cited

U.S. PATENT DOCUMENTS

| | | | | |
|---|---|---|---|---|
| 9,477,771 B2* | 10/2016 | Aoki | ............... | G06F 16/9566 |
| 9,779,066 B2* | 10/2017 | Shah | ............... | G06F 40/12 |
| 2016/0239733 A1* | 8/2016 | Hertz | ............... | G06F 16/9566 |
| 2017/0331789 A1* | 11/2017 | Kumar | ............... | H04L 61/301 |
| 2018/0097831 A1* | 4/2018 | Uppal | ............... | H04L 61/4511 |
| 2019/0238504 A1* | 8/2019 | Gupta | ............... | H04L 61/301 |
| 2020/0065599 A1* | 2/2020 | Sosa-Trustham | ... | G06V 30/224 |
| 2021/0406214 A1 | 12/2021 | Nix | | |
| 2021/0409214 A1* | 12/2021 | Nix | ............... | H04L 9/3242 |

FOREIGN PATENT DOCUMENTS

| | | | | | |
|---|---|---|---|---|---|
| CN | 106408334 A | * | 2/2017 | | |
| CN | 109691105 A | * | 4/2019 | ........... | G06K 9/6255 |
| CN | 110096503 A | * | 8/2019 | | |
| CN | 110750741 A | * | 2/2020 | ......... | G06F 16/9566 |
| CN | 114038480 A | * | 2/2022 | | |

\* cited by examiner

NETWORK ADDRESS COMPRESSION FOR ELECTRONIC DEVICES

CROSS REFERENCE TO RELATED APPLICATIONS

This application is a continuation of U.S. patent application Ser. No. 17/199,426, entitled "Network Address Compression For Electronic Devices", filed Mar. 11, 2021, which claims the benefit of priority to U.S. Provisional Patent Application No. 63/083,015, entitled "Network Address Compression For Electronic Devices," filed on Sep. 24, 2020, the disclosure of which is hereby incorporated herein in its entirety.

TECHNICAL FIELD

The present description generally relates to electronic devices and, more particularly, to network address compression for electronic devices.

BACKGROUND

Uniform resource locators (URLs) are commonly used to identify the locations of data or other resources on a network. With the proliferation of network data, URLs for each specific resource on a network such as the Internet can be lengthy and cumbersome strings of characters.

Conventional URL shortening services can be used replace the domain name of the URL with the domain name of the URL shortening service, and add an identifier that can be referenced by the URL shortening service. In order to access the URL, an end user device must first access the URL shortening service using the shortened URL, the URL shortening service must map the identifier in the shortened URL to the full URL stored at the URL shortening service, and the URL shortening service must use a 403 redirect to redirect the end user device to the URL.

However, shortening a URL in this way removes information about the resource and the host of the resource from the URL, and requires additional communications with the URL shortening service and additional operations by the URL shortening service that can undesirably take time and use additional network and computing resources.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
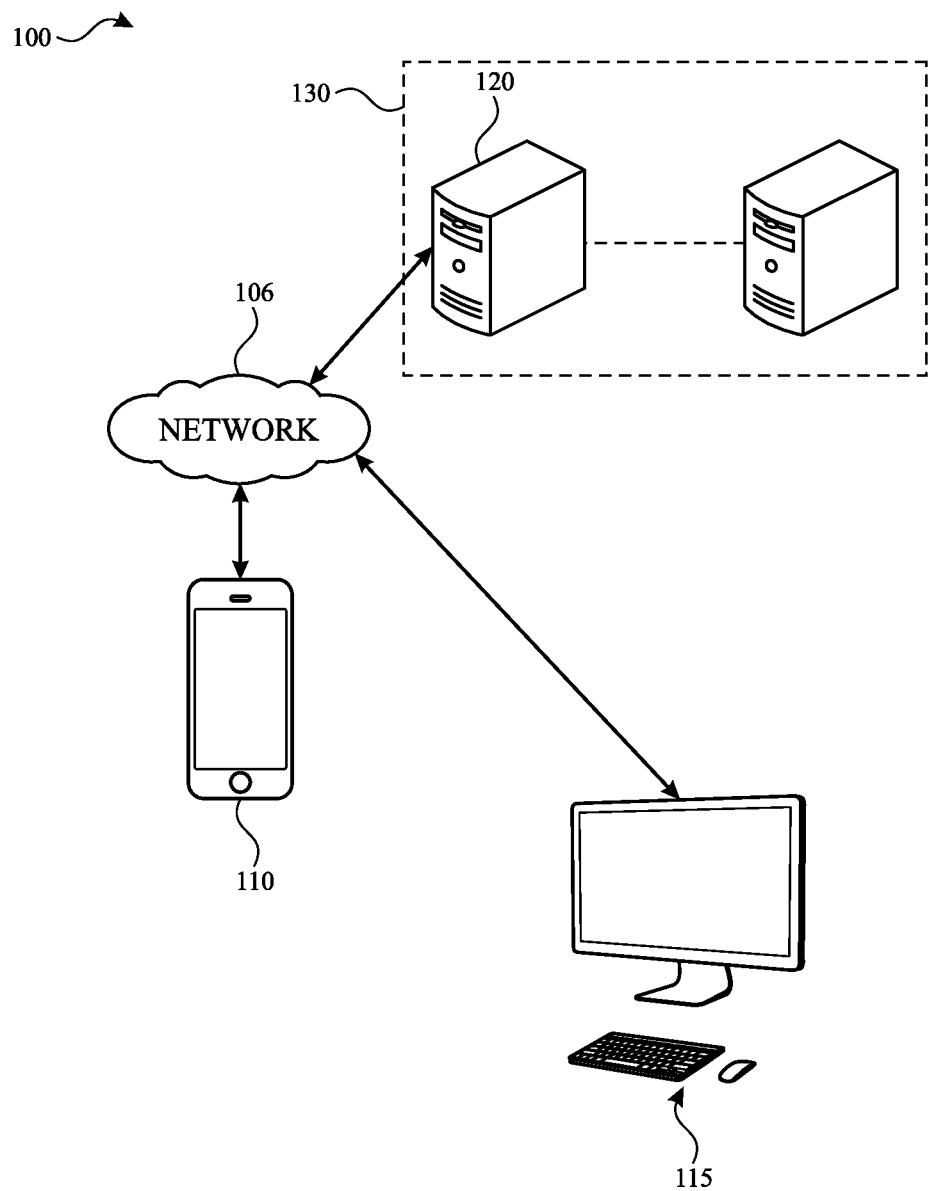
FIG. 1 illustrates an example network architecture in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology provides encoded network identifiers, such as encoded uniform resource locators (URLs) and/or encoded uniform resource identifiers (URIs), that are compressed, relative to the length and/or size of the unencoded network identifier, by an encoding process. In accordance with aspects of the subject technology, the network identifiers can be encoded "in place", to compress the network identifier without including a reference to another server (e.g., a shortening server) that stores some or all of the information from the original URL. Encoded network identifiers can be provided for any suitable network resource that can be associated with a network identifier, including applications and/or transient version(s) of an application that includes less functionality than a full version of the application (as examples).

As discussed in further detail hereinafter, a network identifier may be compressed and encoded in segments, to generate a compact representation of the network identifier. The compact representations may be generated by performing segmented encoding operations that include one or more different encoding schemes for each of one or more segments of the network identifier, and selecting a most compact representation from the various results of the various encoding schemes.

In one or more implementations, a network identifier may be compared with a template network identifier format. Template encoding can be performed as part of the segmented encoding operations, for additional compression efficiency, for network identifiers that match the template format. In various examples, the template format may support a custom domain name, a path from a set of predefined words, and optional query parameters with auto-generated names.

The disclosed segmented encoding operations may also support an optional special subdomain, which can be identified by a predetermined word in the network identifier. If present in the network identifier, the predefined word can be encoded with one bit. This special subdomain can provide the benefit of allowing developers to create unique network identifiers that are compact, readable, and avoid conflict with other existing network identifiers (e.g., other network identifiers with similar segments) that may be used for a different purpose than the network identifier being encoded.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 110, an electronic device 115, and a server 120. For explanatory purposes, the system architecture 100 is illustrated in FIG. 1 as including the electronic device 110, the electronic device 115, and the server 120; however, the system architecture 100 may include any number of electronic devices, peripheral devices, and any number of servers or a data center including multiple servers.

The network 106 may communicatively (directly or indirectly) couple, for example, the electronic device 110, and/or the electronic device 115 with each other device and/or the server 120. In one or more implementations, the network 106 may be an interconnected network of devices that may include, or may be communicatively coupled to, the Internet.

The electronic device 110 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a smartphone. The electronic device 110 may be, and/or may include all or part of the electronic system discussed below with respect to FIG. 8. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 8.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for hosting an application repository, performing privacy-preserving mapping between uniform resource locators (URLs) and application identifiers, and/or verifying and/or authenticating users of the server (e.g., for access to applications in the application repository). In an implementation, the server 120 may function as a cloud server.

Figure 2:
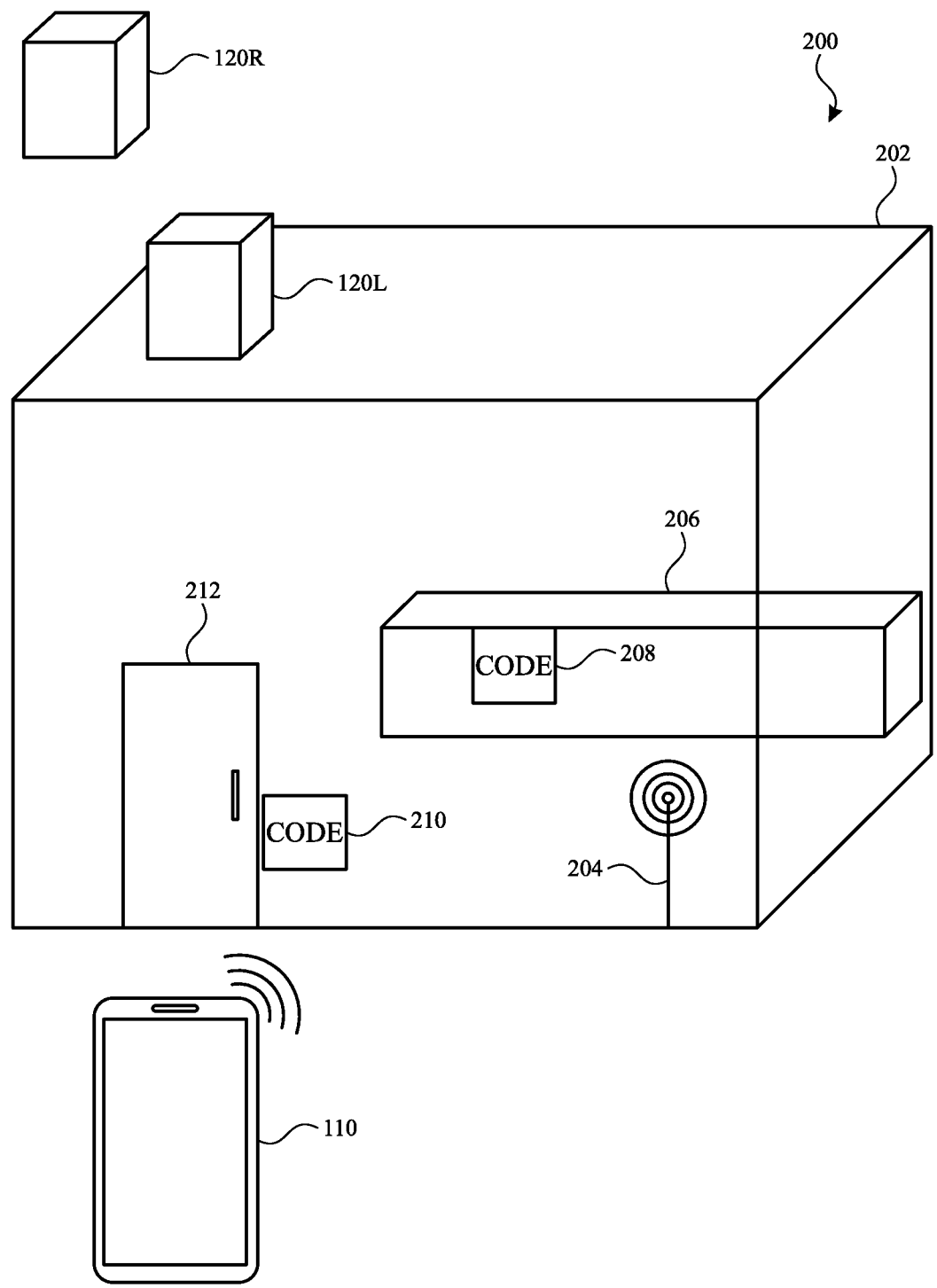
FIG. 2 illustrates an example environment in which an end-user device can obtain a code in accordance with one or more implementations.

FIG. 2 illustrates an example environment 200 in which an electronic device may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The environment 200 includes an electronic device 110, a store 202, and a wireless access point 204 (e.g., a Wi-Fi access point, a cellular access point, an NFC access point, and/or the like). For explanatory purposes, the environment 200 is illustrated in FIG. 2 as including a single electronic device 110, a single store 202, and one wireless access point 204; however, the environment 200 may include any number of electronic devices, any number of stores, and any number of wireless access points.

In the example of FIG. 2, the environment 200 includes scannable codes that can be scanned or otherwise read by the electronic device 110 (e.g., using a camera or other sensor of the electronic device). For example, a user may use a camera or other sensor of electronic device 110 to scan a code such as a bar code or a QR code or another code (e.g., associated with the store), and a network identifier can be obtained by the electronic device based on the scanned code. For example, the electronic device 110 may capture an image of a code, such as code 208 or code 210 of FIG. 2, obtain (e.g., extract) an encoded network identifier from the image of the code), decode the encoded network identifier, and perform various operations (e.g., locally at the electronic device and/or in cooperation with servers 130) to access and/or obtain a resource identified by the decoded network identifier.

In the example of FIG. 2, environment 200 includes a code 208 at a point-of-sale 206 of store 202 and a code 210 at the entrance 212 of the store 202. Code 208 and Code 210 may be the same code or may be different codes. For example, in one implementation, code 208 may be a code associated with the point-of-sale 206 that includes an encoded network identifier that, when decoded by electronic device 110, causes the electronic device 110 to obtain a version of an application for store 202 that includes only a payment functionality. Code 210 may be a code associated with the entrance 212 to store 202 that includes an encoded network identifier that, when decoded by electronic device 110, causes the electronic device 110 to obtain a version of the application for store 202 that includes only an online ordering functionality or includes an online ordering functionality and a payment functionality.

In another example, electronic device 110 may communicate with one or more access points such as wireless access point 204 to determine that the electronic device 110 is at or near the location of store 202. Electronic device 110 may communicate with local server 120L associated with store 202 and/or with remote server 120R to determine obtain an encoded network identifier such as an encoded URL for an application associated with store 202 based on the location of electronic device 110 at or near the store.

The environment 200 includes a store and codes 208 and 210 associated with the store. However, this is merely an example, and it should be appreciated that the environment 200 may include other commercial or non-commercial locations, buildings, venues, indoor environments, outdoor environments and/or any other places or objects that can be associated with a scannable code that includes an encoded network identifier.

Codes 208 and 210 may be implemented as bar codes or quick response (QR) codes in some examples. Bar codes and/or QR codes may include sufficient visual complexity to include all of the information in a network identifier of substantially any size. However, in some scenarios, it may be desirable to be able to embed a network identifier in a visual object (e.g., a logo for the store, or artwork on the wall of the store) that does not support enough complexity to embed network identifiers of arbitrary size. For example, in some scenarios, it may be desirable to generate codes 208 and 210 that embed network identifiers having a size of less than or equal to 128 bits. It may also be desirable to generate network identifiers that have a size less than a size threshold or a length less than a length threshold in other scenarios that do not include visual codes such as codes 208 and 210.

In order to provide network identifiers (e.g., URLs, URIs, and the like) of substantially any size, within a size limit (e.g., 128 bits) or a length limit (e.g., for embedding in one of codes 208 or 210), segmented encoding operations can be performed to compress and encode the network identifier as described herein. In one or more implementations, once an encoded network identifier having a number of characters that is less than the number of characters in the unencoded network identifier has been generated, the characters of the encoded identifier can be further encoded into a visual representation for inclusion in codes 208 or 210, in one or more implementations.

Figure 3:
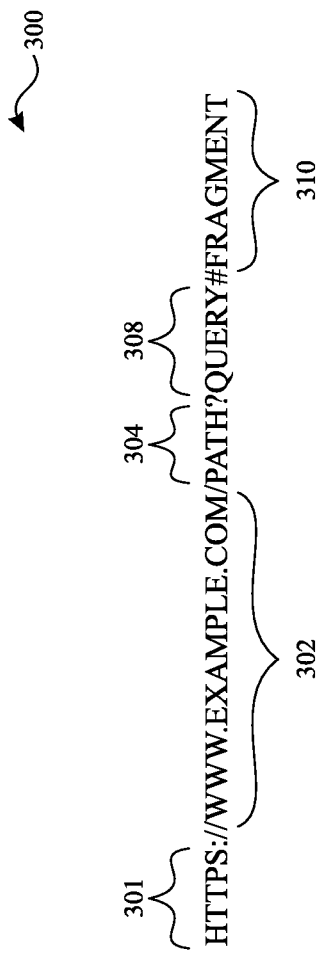
FIG. 3 illustrates an example network identifier in accordance with one or more implementations.

FIG. 3 illustrates an example of a network identifier 300 that can be encoded and/or compressed using the segmented encoding operations described herein. In the example of FIG. 3, network identifier 300 includes a string of characters that define a protocol 301 (e.g., "https"), a host 302 (e.g., "www.example.com"), a path 304 (e.g., "path"), a query 308 (e.g., "query"), and a fragment 310 (e.g., "fragment"). Each of the protocol 301, the host, 302, the path 304, the query 308, and the fragment 310 (e.g., and the characters thereof) may be referred to as a segment of the network identifier 300. In this example, the host 302 itself includes multiple segments including a subdomain (e.g., "www" in the example of FIG. 3), a domain (e.g., "example" the example of FIG. 3), and a top level domain (TLD) (e.g., ".com" in the example of FIG. 3). In another example, the subdomain may be a special subdomain that is identified by a predetermined word that functions as a flag for the segmented encoding operations, as described in further detail hereinafter.

The segmented encoding operations described herein may include determining an encoding scheme for each network identifier by encoding the network identifier using multiple predefined encoding schemes, and identifying the most efficient encoding scheme for that network identifier based on the results the multiple encodings. In this way, an efficient compression of each network identifier can be obtained. In one or more implementations, each of the multiple encoding schemes for the segmented encoding operations may include dividing the network identifier into three initial segments (e.g., the protocol, the host, and the rest of the network identifier), further dividing the host into domain and a Top Level Domain (TLD) (e.g., to attempt a more optimized compression for each), and attempting to match the network identifier against a predefined template (e.g., for potentially more efficient compression of the network identifier if the network identifier conforms to the template format).

In one or more implementations, the segmented encoding operations may include dividing the network identifier 300 into the segments of the protocol 301, host 302, path 304, query 308, and fragment 310. The segmented encoding operations may also include determining whether the host 302 includes a prefix corresponding to a predetermined word for a special subdomain. If the host has the prefix, the segmented encoding operations may include removing the prefix and outputting a value of one to encoding bits for inclusion in the encoded network identifier, to indicate the special domain is used. If the host does not include the prefix, a value of zero may be output to encoding bits for inclusion in the encoded network identifier.

In one or more implementations, the segmented encoding operations may also include determining a first set of encoding operations for encoding the host 302. For example, the segmented encoding operations may select a set of encoding operations for the host that results in a smallest length of bits, from one a first group of encoding operations, a second group of encoding operations, and a third group of encoding operations. In various implementations, encoding and/or compression operations may be performed based on one or more codebooks. A codebook may be defined by a set of tables for encoding and decoding that respectively map a symbol to a coded version of the symbol, or vice versa.

The first group of encoding operations that may be considered for the first set of encoding operations may include compressing the TLD with a TLD codebook (e.g., the TLD Huffman codebook or another TLD codebook), and compressing the domain with a domain codebook (e.g., the domain Huffman codebook or another domain codebook such as a multi-context domain codebook). For example, the TLD Huffman codebook maps Top Level Domains (TLDs) to variable length bit sequences, and is designed such that the most popular TLD (e.g., ".com") requires only one bit, and the longest bit sequence in the table is eight bits. For example, the domain Huffman codebook is generated by analyzing domains from the most frequently visited websites, and can be used to encode either the domain or the domain and TLD segments of a host in some implementations.

The second group of encoding operations may include compressing the TLD with a TLD fixed length index table, and compressing the domain with the domain codebook. The TLD fixed length index table uses a fixed-length 8-bit index table to encode TLDs that are not encoded with the TLD codebook (e.g., the TLD Huffman codebook or another TLD codebook). The TLD fixed length index table encodes the TLDs that are not included in the TLD codebook to, for example, less than twenty bits or less than ten bits, which is more efficient than using, for example, a Huffman codebook to represent the additional 256 domains, which would result in various TLD symbols mapping to tens of bits.

The third group of encoding operations may include compressing the entire concatenated domain and TLD with the domain codebook (e.g., the domain Huffman codebook or another domain codebook such as a multi-context domain codebook).

The segmented encoding operations may include selecting the first set of encoding operations from among the first, second, and third groups of encoding operations, by (i) encoding the host using the first group of encoding operations, the second group of encoding operations, and the third group of encoding operations, (ii) selecting the shortest result from the first group of encoding operations, the second group of encoding operations, and the third group of encoding operations, (iii) outputting the compressed bits of the shortest result for inclusion in the encoded network identifier, and (iv) outputting an op-code (also referred to herein as a host bit) that identifies the selected group of encoding operations that generated the selected shortest result.

It should be appreciated that none of the first group of encoding operations, the second group of encoding operations, and the third group of encoding operations reference or include any domain other than the domain in the host 302 of the network identifier. Accordingly, the domain is encoded without adding domain information for any domain (e.g., a domain of a URL shortening service or server) other than the domain of the network identifier.

In one or more implementations, the segmented encoding operations may also include determining a second set of encoding operations for encoding the path 304, the query 308, and/or the fragment 310. For example, the segmented encoding operations may select a second set of encoding operations for the path, query, and/or fragment that results in a smallest length of bits from one a fourth group of encoding operations, a fifth group of encoding operations, and a sixth group of encoding operations.

For example, the fourth group of encoding operations may include concatenating the path, the query, and/or the fragment, and compressing the concatenated path, query, and/or fragment using multi-context encoding for concatenated path and query data. Multi-context encoding for concatenated path and query data may include encoding using a two-context model that uses up to two most recent symbols to provide a context with which to choose a codebook to encode the next symbol in the concatenated path, query, and/or fragment. For example, a dot in the previous two encoded symbols can indicate one or more characters likely to appear after the dot in a network identifier. This multi-context encoding can be performed using a collection of codebooks that ensures that a codebook exists for every pair of two previous symbols. For example, during multi-context encoding, the encoder may determine which codebook of the collection of codebooks to use, according to the encoding context, based on (e.g., up to) two recently encoded previous symbols. The encoding context for the multi-context encoding may have been generated from, for example, concatenated path and query components of a dataset with a set of frequently user-engaged network identifiers.

The fifth group of encoding operations may be performed if the network identifier does not have a fragment. In one or more implementations, if the network identifier does include a fragment, the fourth group of encoding operations described above may be selected as the second set of encoding operations for compressing the path, query, and/or fragment (e.g., without performing the fifth or sixth groups of encoding operations). When the fifth group of encoding operations is performed (e.g., for network identifiers that do not include a fragment), the fifth group of encoding operations may include compressing the path and compressing the query individually (e.g., separately). In one or more implementations, compressing the path may include encoding one or more path components by selecting an encoding of a word in the path from a predefined word table that includes the word. Examples of path words that may be included, with corresponding encoding bits, in the table are: "order", "pay", "access", "view", "category", "list", "track", "store", "menu", and "reserve". In one or more implementations, compressing the path and/or compressing the query may include performing compression of each of the path and/or the query using, for example, a segmented path and query multi-context codebook, a fixed-length 6-bit character index, and/or an integer encoding scheme. The segmented path and query multi-context codebook may correspond to a collection of codebooks generated from, for example, segmented path and query components of a dataset with a set of frequently user-engaged network identifiers, and may use up to two most recent symbols in the segmented path or the segmented query, to provide a context with which to choose a codebook to encode the next symbol in the segmented path or segmented query.

The fixed-length 6-bit character index may include an encoder that represents characters from a fixed set with six bits. The fixed set of characters includes, for example, characters from 'a' to 'z', 'A' to 'Z', '0' to '9' and a special end marker character. The integer encoder may use, for example, Little Endian Base 128 (LEB128) encoding to encode integers in path components or query string argument values (e.g., in contrast with encoding each of their digits as characters).

Figure 4:
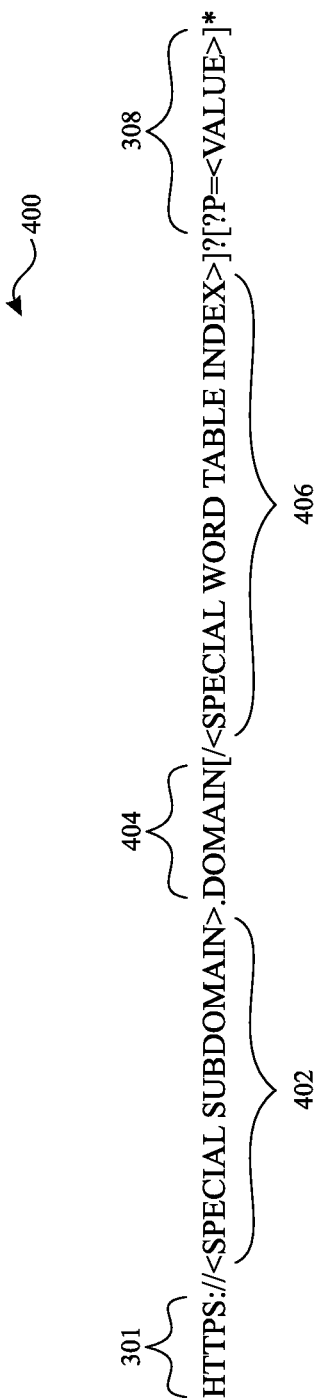
FIG. 4 illustrates an example network identifier in a template format in accordance with one or more implementations.

The sixth group of encoding operations may be performed if the network identifier matches a template format. FIG. 4 illustrates an example of a network identifier 400 having the template format. As shown in FIG. 4, a network identifier in the template format may include the "https" protocol, a host that includes a special subdomain 402 and a domain 404, a path 406 that includes (e.g., only) words from a special word table index defined for the template, and a query 308. In the template format, the path 406 is optional and, if included, includes one path component (e.g., selected from the words in the special word table index). In the template format, the path 406 is a predefined word selected from a table of words likely to be used in a path of a network identifier. Examples of path words in the table are: "order", "pay", "access", "view", "category", "list", "track", "store", "menu", and "reserve". In the template format, the query 308 includes zero or more query string arguments, and the argument names are auto-generated names, such as p, p1, p2, . . . , pn.

The sixth group of encoding operations include encoding the path and query according to the template (e.g., using a template encoding scheme). Encoding the network identifier according to the template may include encoding the special subdomain 402 with one bit (e.g., zero or one), and encoding the path 406 having the special word with a path special words fixed-length 8-bit index. The path special words fixed-length 8-bit index may include encodings for the table of special words that are likely to appear in a path of a network identifier, and encode each of the special words efficiently using only eight bits. The template encoding of the other portions of the network identifier 400 (e.g., the domain and/or the query) may include encoding these portions of the network identifier using any of the encoding operations described herein and/or any combination thereof.

Selecting the second set of encoding operations may include, if the network identifier includes a fragment, selecting the result of the fourth group of encoding operations, and outputting an op-code that indicates the fourth group of encoding operations was used to generate the selected result. Selecting the second set of encoding operations may include, if the network identifier does not include a fragment, determining which of the result of the fourth group of encoding operations, the fifth group of encoding operations, or the sixth group of encoding operations (if performed) is the shortest result, outputting the shortest result for inclusion in the encoded network identifier, and outputting a op-code (also referred to herein as a segmentation bit) that identifies the one of the fourth group of encoding operations, the fifth group of encoding operations, or the sixth group of encoding operations that generated the selected shortest result.

In one or more implementations, the segmented encoding operations may also include setting an additional op-code (also referred to herein as a template bit) that identifies whether the template encoding (e.g., the sixth group of encoding operations) was used. The additional op-code may be set to one if the template encoding was used, or to zero if the template encoding was not used.

In order to generate the encoded network identifier (e.g., and provide the encoded network identifier such as for visual encoding into one of codes 208 or 210 for later decoding and access of associated resources by an end-user device such as electronic device 110), the segmented encoding operations may also include concatenating the selected encoded bit segments for the protocol, special subdomain, the host, the path, the query, and/or the fragment, and/or one or more op-codes associated with the selections, to form the encoded network identifier.

For example, concatenating the selected bit segments and op-codes may include including laying out the bits of the encoded network identifier in an order such as:
[is template] [special subdomain] [host encoding strategy] [host] [segmented] [path] [query],
where each [ ] pair represents a group of bits as follows.

For example, [is template] may include a single template bit that is set to one if the encoded network identifier was encoded using template encoding or set to zero otherwise. For example, [special subdomain] may also include a single subdomain bit that is set to one if the network identifier included a special subdomain or set to zero otherwise. For example, [host encoding strategy] may include one or more host bits that indicate which of several groups of encoding operations were used to encode the host of the network identifier. For example, the host bits in [host encoding strategy] may be set to zero if the first group of encoding operations described herein was used to encode the host, set to "10" if the second group of encoding operations described herein was used to encode the host, or set to "11" if the third group of encoding operations described herein was used to encode the host. The [host] may include the encoded host that was encoded according to the encoding scheme identified by the [host encoding strategy].

The [segmented] bits may include one or more segmentation bits that indicate whether a path and a query in the network identifier were encoded separately (e.g., segmented and then encoded, such as using the fifth group of encoding operations described herein) or encoded together (e.g., concatenated and encoded, such as using the fourth group of encoding operations described herein). For example, the [segmented] bits may include a single bit that is set to zero if the path and query were encoded together, or set to one if the path and query were segmented and encoded separately. It should also be appreciated that the [segmented] portion of the encoded network identifier may occupy zero bits if the [is template] is set to one (e.g., indicating that the sixth group of encoding operations, the template encoding, was used). In this way, the [is template] and [segmented] bits can identify whether the fourth, fifth, or sixth groups of encoding operations were used to encode the path, query, and/or fragments in the network identifier. The [path] and [query] may include the encoded respective path and query, that were encoded according to the encoding scheme identified by [is template] and/or [segmented]. In one or more implementations, when segmented encoding was used for encoding the path and query separately, the [path] bits and/or the [query] bits may include one or more encoding type bits that identify a type of encoding that was used for that segment of the network identifier. For example, the encoding type bits may identify a path alphabet, use of integer (e.g., LEB128) encoding, use of fixed-length 6-bit alphabet encoding, and/or use of special words in the encoding of one or more portions of the path and/or query. In one or more implementations, when the template encoding is used (e.g., [is template]=1), the [path] may be provided with a template word index corresponding to a special word in the path.

Encoding of variable length strings may include specifying an end marker (also referred to as EOF or EOF marker) to signify the end of a stream or end of encoding of a segment of the stream. However, in one or more implementations the EOF itself can add overhead to the encoding.

In one or more implementations, the segmented encoding operations may include operations that reduce or eliminate the use of EOF markers in an encoded network identifier. For example, in the segmented encoding operations, the last segment of the network identifier may be encoded without an EOF marker. For example, after the last segment, the decoder has no more bits to read and may thus be able to identify the end of the last segment without an EOF marker. However, a problem can arise when the length of encoded data is smaller than the allowed number of bits (e.g., 128 bits) for the encoding, because the encoded network identifier may be padded with zeros to fill the allowed number of bits. Without an end marker, the decoder may see more bits in the stream after decoding the last valid symbol. To address this problem, the segmented encoding operations may move all of the encoded bits to the right of the available (e.g., 128 bit) bit array, such that the last encoded bit is in the last bit index (e.g., bit index 127). The segmented encoding operations may also mark the beginning of the stream with a '1' bit set as the most significant bit (MSB) of the encoded data. With this encoding, the decoder in turn skips all of the left-most '0' bits until it sees the first bit '1', and then starts decoding the rest of the bits of the encoded identifier.

The segmented encoding operations may also reduce the use of EOF markers by encoding integer data using integer encoding (e.g., LEB128) which produces a variable-length encoding and eliminates the need for an explicit EOF at the end of the encoded integer data. The segmented encoding operations may also reduce the use of EOF markers by using Huffman and/or fixed-length TLD encodings, which do not include an EOF since the decoder knows that the TLD is one symbol. The segmented encoding operations may also reduce the use of EOF markers by using the template encoding when the network identifier conforms to the template format. For example, in the template format, the query argument values may have an EOF if they are alphabetical values. However, since the decoder for a network identifier that conforms to the template format knows from [is template] that it is decoding an array of values, the values can be provided without including begin markers to indicate a new query item to be decoded. A network identifier in the template format with one argument can be encoded without an EOF for the argument due to the right-justification/MSB operations described above. For a network identifier in the template format with multiple arguments, the last argument can be provided without an EOF for the argument due to the right-justification/MSB operations described above. The segmented encoding operations may also reduce the use of EOF markers by, when encoding individual query items, ordering the encoded bits for parameter name and parameter value such that the need for EOF is reduced or eliminated. For example, if the value is encoded using LEB128 for the last query item, the value is encoded before the argument name. This can eliminate the user of an EOF for the argument name.

Figure 5:
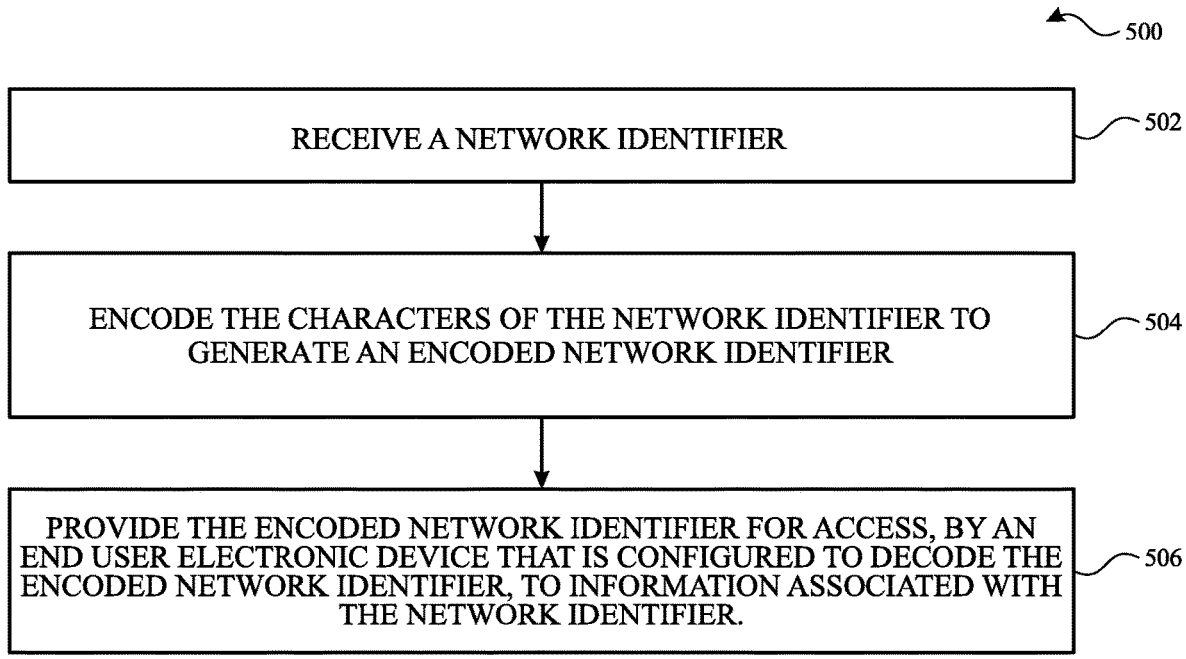
FIG. 5 illustrates a flow diagram of an example process for compressing and encoding a network identifier in accordance with one or more implementations.

FIG. 5 illustrates a flow diagram of an example process for encoding a network identifier, in accordance with one or more implementations. For explanatory purposes, the process 500 is primarily described herein with reference to the electronic device 110 and server 120 of FIG. 1. However, the process 500 is not limited to the electronic device 110 and server 120 of FIG. 1, and one or more blocks (or operations) of the process 500 may be performed by one or more other components of the server 120 or the electronic device 110 and/or by other suitable devices such as electronic device 115. Further for explanatory purposes, the blocks of the process 500 are described herein as occurring in series, or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, a network identifier (e.g., having an associated length defined by a number of characters in the network identifier) may be received (e.g., by an electronic device such as electronic device 110 and/or by a server such as server 120). The network identifier may include a string of characters (e.g., a string of characters defining various parts of the network identifier, such as a domain, a path, a host, etc.)

At block 504, the characters of the network identifier may be encoded to generate an encoded network identifier. The encoded network identifier may include fewer characters than the number of characters in the network identifier. In one or more implementations, encoding the characters of the network identifier to generate the encoded network identifier may including identifying a special subdomain in the network identifier, and encoding the special subdomain with a single bit in the encoded network identifier. In one or more implementations, the special subdomain identifies a resource associated with the network identifier as a transient version of an application for the end user electronic device, the transient version including less functionality than a full version of the application. For example, the full version of the application may be associated with a network identifier having the same domain but not including the special subdomain. Additional example operations that can be performed for encoding the characters of the network identifier are described in further detail in connection with FIG. 6.

At block 506, the encoded network identifier may be provided (e.g., to another electronic device and/or for embedding in a scannable code such as a code 208 or code 210 of FIG. 2) for access, by an end user electronic device that is configured to decode the encoded network identifier, to information associated with the network identifier. In one or more implementations, providing the encoded network identifier for access by the end user electronic device may include providing the encoded network identifier to one or more external systems configured to distribute the encoded network identifier to end user electronic devices. Distributing the encoded network identifier to end user electronic device may include visually encoding the encoded network identifier into a code such as codes 208 and 210 of FIG. 2, or providing the encoded network identifier, via a network, to the end user electronic devices (e.g., responsive to a user action such as clicking a link, or responsive to a device location such as when the device enters a store).

Figure 6:
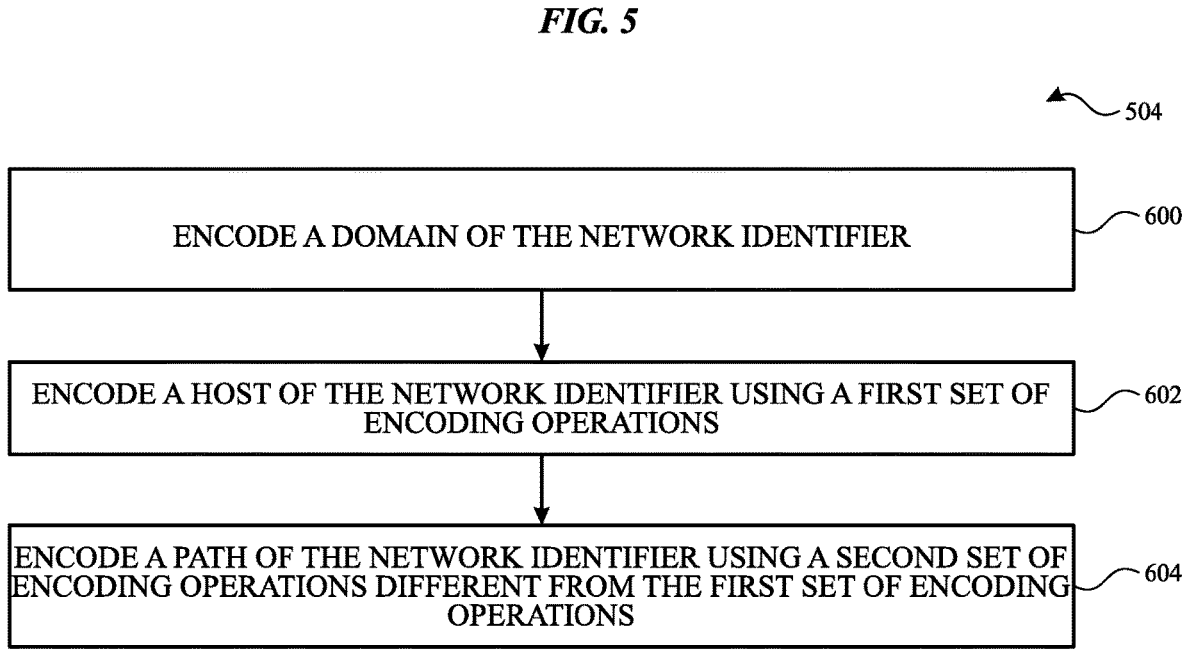
FIG. 6 is a flow diagram illustrating additional details of the example process of FIG. 5 in accordance with one or more implementations.

FIG. 6 is a flow chart of illustrative operations that may be included in the encoding operations of block 504.

At block 600, a domain of the network identifier may be encoded. For example, encoding the domain of the network identifier may include encoding the characters of the domain of the network identifier (e.g., without adding domain information for any domain other than the domain of the network identifier). For example, the domain may be compressed separately from the top level domain or concatenated with the top level domain using a domain codebook such as the domain Huffman codebook and/or a multi-context domain codebook.

At block 602, a host of the network identifier may be encoded using a first set of encoding operations. For example, the host segment of the network identifier may be divided into parts (e.g., three segments, such as a prefix such as a subdomain or special subdomain, a domain, and a top level domain (TLD)). If the prefix for the domain is a special subdomain, the special subdomain may be encoded using only one bit. This subdomain may be provided in the network identifier (e.g., by a developer of a resource) to describe specific resource with the network identifier, and may be set to a predefined or predetermined word or string.

In one or more implementations, the domain and/or the TLD can be encoded using any of multiple groups of encoding operations, depending on the compactness of the result of the encoding. For example, the TLD can be compressed using a TLD codebook (e.g., the TLD Huffman codebook) and the domain can be compressed using a domain codebook (e.g., the domain Huffman codebook or another domain codebook such as a multi-context domain codebook) with a first group of encoding operations. As another example, the TLD can be compressed using the TLD fixed-length table index described herein, and the domain can be compressed with the domain codebook, in a second group of encoding operations. As another example, the entire concatenated domain and TLD can be compressed with the domain codebook, in a third group of encoding operations. Encoding the host using the first set of encoding operations may include encoding the host with each of the first, second, and third groups of encoding operations, and selecting the group that provides the most compact result. An op-code may be included in the encoded network identifier that indicates which group of encoding operations was used for encoding the host, and that can be used by a decoder to determine how the host bits should be decoded.

In one or more implementations, the first set of encoding operations may include encoding the host using at least two encoding schemes (e.g., at least two of the first group of encoding operations, the second group of encoding operations, and the third group of encoding operations as described herein), and selecting one of the encodings of the host resulting from the at least two encoding schemes for inclusion in the encoded network identifier.

At block 604, a path of the network identifier may be encoded using a second set of encoding operations different from the first set of encoding operations. For example, after separating the protocol and host segments from the network identifier, the rest of the network identifier may include an optional path, an optional query, and optional fragment components. The characters in the rest of the network identifier may include characters from the set including characters from 'a' to 'z', 'A' to 'Z', '0' to '9', and '/#?=%-._,+;:&', and/or generally any other characters.

In one or more implementations, the rest of the network identifier can be encoded using any of multiple groups of encoding operations, depending on the compactness of the result of the encoding. For example the entire rest of the network identifier may be concatenated and compressed (e.g., using multi-context encoding as described herein), in a fourth group of encoding operations. As another example, the path and query segments may be separated and compressed individually in a fifth group of encoding operations. The fifth group of encoding operations may provide the advantage of implicitly encoding parts of the path and query such as characters '/', '&', and '='. Moreover, encoding each individual path component and query item can compress each segment more efficiently in some scenarios since, for example, integers can be efficiently encoded (e.g., using LEB128) instead of encoding each individual character. As another example, the path and query segments may be compressed using a template encoding if the network identifier conforms to a template format, in a sixth group of encoding operations Encoding the rest of the network identifier (e.g., the path, the query, and/or the fragments) using the second set of encoding operations may include encoding the rest of the network identifier with each of the fourth, fifth, and sixths groups of encoding operations, and selecting the group that provides the most compact result. An op-code may be included in the encoded network identifier that indicates which group of encoding operations was used for encoding the rest of the network identifier, and that can be used by a decoder to determine how the bits for the rest of the network identifier should be decoded.

In one or more implementations, the second set of encoding operations may include determining whether the network identifier has a format that matches a template format (e.g., the template format described above in connection with FIG. 4), encoding the path (e.g., and/or a query and/or a fragment) of the network identifier using a first encoding scheme (e.g., the fourth group of encoding operations or the fifth group of encoding operations described herein) irrespective of whether the network identifier has the format that matches the template format, encoding the path (e.g., and/or a query and/or a fragment) of the network identifier using a second encoding scheme (e.g., the sixth group of encoding operations described herein) if the network identifier has the format that matches the template format, and selecting one of the encodings of the path (e.g., and/or a query and/or a fragment) from the first encoding scheme or the second encoding scheme if the network identifier has the format that matches the template format. In one or more implementations, encoding the path (e.g., and/or a query and/or a fragment) of the network identifier using the second encoding scheme may include encoding the path and one or more queries of the network identifier using the template encoding scheme (e.g., the sixth group of encoding operations described herein).

Figure 7:
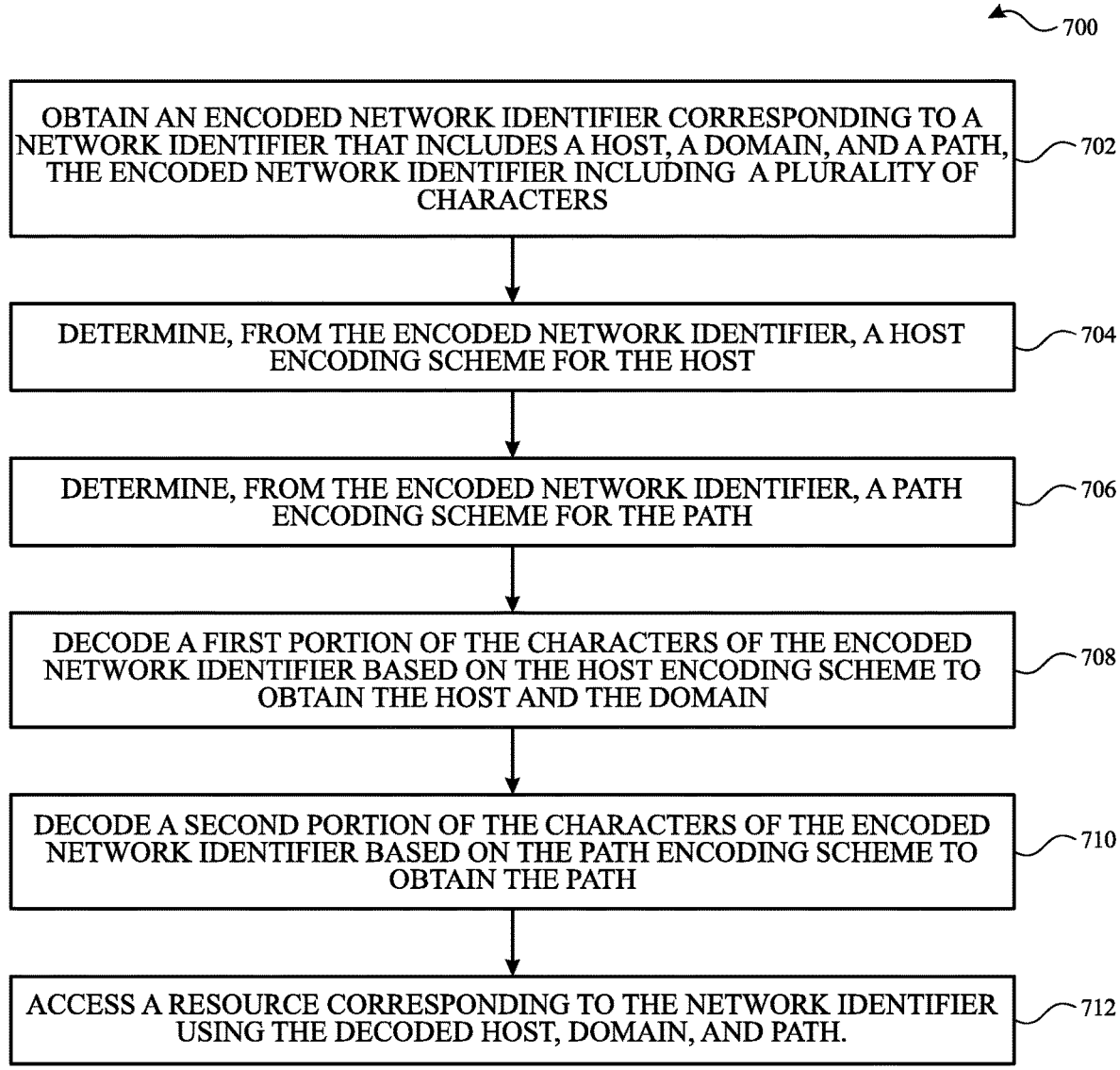
FIG. 7 illustrates a flow diagram of an example process for decoding an encoded network identifier in accordance with one or more implementations.

FIG. 7 illustrates a flow diagram of an example process for decoding an encoded network identifier, in accordance with one or more implementations. For explanatory purposes, the process 700 is primarily described herein with reference to the electronic device 110 and server 120 of FIG. 1. However, the process 700 is not limited to the electronic device 110 and server 120 of FIG. 1, and one or more blocks (or operations) of the process 700 may be performed by one or more other components of the server 120 or the electronic device 110 and/or by other suitable devices such as electronic device 115. Further for explanatory purposes, the blocks of the process 700 are described herein as occurring in series, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, an encoded network identifier corresponding to a network identifier that includes a host, a domain, and a path, may be obtained. The encoded network identifier includes a plurality of characters. Obtaining the encoded network identifier may include, for example, clicking a link including the encoded network identifier, scanning a visual code such as one of codes 208 and 210 of FIG. 2 and extracting the encoded network identifier from the scanned visual code, and/or receiving the encoded identifier via a network access point (as examples). The encoded network identifier may be obtained, for example, by an end user electronic device such as electronic device 110. For example, obtaining the encoded network identifier may include obtaining a code containing the encoded network identifier, and extracting the encoded network identifier from the code. In one or more implementations, obtaining the code may include capturing an image of the code with a camera.

At block 704, a host encoding scheme for the host may be determined from the encoded network identifier. For example, determining the host encoding scheme may including identifying a first set of encoding operations that were used to encode the host based on an op-code in the encoded network identifier. For example, determining the host encoding scheme for the host may include determining, based on a host bit in the encoded network identifier, whether the domain and a top level domain of the host are encoded differently (e.g., using the first group of encoding operations or the second group of encoding operations described herein, each of which use a different codebook for the domain and the top-level domain), e.g., or whether the domain and the top level domain were encoded using a common codebook (e.g., using the third group of encoding operations described herein).

At block 706, a path encoding scheme for the path may be determined from the encoded network identifier. For example, determining the path encoding scheme may including identifying a second set of encoding operations that were used to encode the path based on an additional op-code (e.g., a segmentation bit) in the encoded network identifier. For example, determining the path encoding scheme for the path may include determining, based on a segmentation bit in the encoded network identifier, whether the path is encoded together with a query of the network identifier. In one or more implementations, determining the path encoding scheme for the path may include determining, based on a template bit in the encoded network identifier, whether the path encoding scheme is a template encoding scheme.

At block 708, a first portion of the characters of the encoded network identifier may be decoded based on the host encoding scheme to obtain the host and the domain. For example the encoded host (e.g., including a subdomain, a special subdomain, a domain, and/or a top level domain) may be decoded by reversing the one of the first, second, or third group of encoding operations that is identified by the host bit in the encoded identifier as having been used to encode the host.

At block 710, a second portion of the characters of the encoded network identifier may be decoded based on the path encoding scheme to obtain the path. For example the encoded path, query(ies), and/or fragment(s) may be decoded by reversing the one of the fourth, fifth, or sixth group of encoding operations that is identified by the segmentation bit and/or the template bit in the encoded identifier as having been used to encode the path.

At block 712, a resource corresponding to the network identifier using the decoded host, domain, and path may be accessed (e.g., by electronic device 110). For example, in one or more implementations, multiple versions of an application may be available. Each version of a particular application, and the application itself (e.g., the full application) may have the same application identifier, or a same portion of the application identifier, in common with other versions of the same application. Each version of the application may be a reduced-functionality version of the application that has less functionality than a full version of the application. In some examples, the application may be an application associated with a location such as the store 202 (e.g., an application associated with a particular online and/or brick-and-mortar retailer).

The full version of the application may be obtained, such as from a remote server 120R, when the a user of electronic device 110 accesses an application repository at the remote server, selects the application from various applications in the application repository, provides authenticating information to the remote server 120R to verify access to a user account at the remote server 120R, downloads and installs the code for the application after the authenticating information is verified by the remote server, and then installs and launches the application.

The full version of the application may provide various functionalities such as a payment functionality, an online ordering functionality, a store locator functionality, an account access functionality, an application settings functionality, a search functionality, a helpdesk functionality, an order history functionality, a newsfeed functionality, an image capture functionality, a messaging functionality, a mapping functionality, etc. The full version of the application may be able to access, and/or request authorization to access, more components and/or more data at the electronic device 110 than a reduced-functionality version of the application. For example, the full version of the application may be able to request access to a photo library associated with the electronic device, where a reduced-functionality version of the application is prevented from requesting access to the photo library. In another example, a reduced-functionality version of the application may be able to access a subset of the components (e.g., sensors, cameras, etc.) that are accessible by the full application.

However, in various operational scenarios, the user may not need all of the functionality of the full application, and/or the user may not be able to, or desire to, spend the time and/or energy to locate, authenticate for, download, install, and launch the full application. For example, in the network environment of FIG. 2, the user of electronic device 110 may arrive and/or walk into store 202 without having installed the full application associated with the store on electronic device 110. However, the user may benefit from the ability to use one or more portions of the functionality of the application for store 202 while at the store 202. For example, the user may desire to use the payment functionality of the application to pay for a good or a service at the store 202. As another example, the user may desire to skip a line at the store by utilizing the online ordering functionality of the application. In one or more implementations, multiple reduced-functionality versions of the application (e.g., a payment functionality version, a ordering functionality version, an eat-in ordering functionality, a take-out ordering functionality, a reservations functionality, a mapping functionality, etc.) may be available.

In these scenarios, it may be helpful to provide the user with the ability to obtain one or more of the reduced-functionality versions of the application (sometimes referred to herein as a clip of the application, an application clip, a version of a full application having less functionality than the full application, a transient version of the application that has less functionality than the full application, or a portion of the application) without having to spend the time and energy of locating, authenticating for, downloading, and installing the full application. For example, the version of the application may be temporarily installed on electronic device 110 (e.g., when the user arrives at or enters store 202) and then deleted after a period of non-use (e.g., after the user leaves the store 202), when the user closes the version of the application, and/or when the user obtains the full version of the application. A version of an application such as a reduced-functionality version of an application (e.g., an app clip) can include functionality that is different from (or not included in) the full version of the application.

An environment such as the environment 200 of FIG. 2 may allow for the electronic device 110 to obtain an encoded network identifier or encoded network locator such as an encoded uniform resource locator (URL) or an encoded uniform resource identifier (URI) for an application (e.g., the full application associated with store 202), a transient version of the application that includes less functionality than a full version of the application, or any other network resource, the encoded network identifier having been encoded using the segmented encoding operations described herein.

Once an encoded network identifier is obtained (e.g., by an end user electronic device such as electronic device 110), the encoded network identifier can be decoded (e.g., at the electronic device 110) to obtain a decoded network identifier. Decoding the encoded network identifier at the electronic device, using the op-codes included in the encoded network identifier itself, can help ensure that the privacy of the user is protected (e.g., because a connection to and/or interaction with a server, which could reveal information such as location information of the electronic device to the server before the content of the network identifier is even known, is not needed to obtain the decoded network identifier). The decoded network identifier can be used to obtain the application, transient version of the application, and/or other resource associated with the decoded network identifier.

In one or more implementations, obtaining the application, transient version of the application, and/or other resource associated with the decoded network identifier may include determining (e.g., at electronic device 110), based on at least the first portion of the decoded network identifier, that at least the version of the application is available without user authentication, in part, by determining, at the electronic device, whether the decoded network identifier is associated with an identifier of any application. Determining whether the decoded network identifier is associated with an identifier of any application may include providing a hash of the decoded network identifier (e.g., the entire decoded network identifier or a portion of the decoded network identifier) to a filter such as a Bloom filter at the electronic device and configured to return a positive result if the decoded network identifier may map to an application identifier (e.g., at a server that stores registered mappings between network identifiers and application identifiers) or a negative result if the decoded network identifier is not mapped to any application identifier. If the Bloom filter indicates that the decoded network identifier does not map to any application identifier, the electronic device may navigate directly to the decoded network identifier (e.g., using a web browser).

In one or more implementations, electronic device 110 may provide one or more progressive subsets or truncations of the decoded network identifier to the Bloom filter, if the Bloom filter indicates that the decoded network identifier does not map to any application identifier based on the hash of the full decoded network identifier (e.g., in a circumstance in which the Bloom filter does not include information for the arguments in a decoded network identifier and thus indicates that the decoded network identifier does not map to any application identifier).

Determining, based on at least the first portion of the decoded network identifier, that at least the version of the application is available without user authentication may include (e.g., if a local Bloom filter at the electronic device indicates that the decoded network identifier may map to an application identifier) providing at least the first portion of the decoded network identifier (e.g., a prefix of the decoded network identifier, a hash of a prefix of the decoded network identifier, a prefix of a hash of the decoded network identifier, or a hash of the decoded network identifier) to a remote server such as server 120 and receiving, from the remote server, a set of data that includes one or more identifiers of applications and/or identifiers of versions of applications that are associated with at least the first portion of the decoded network identifier.

In one or more implementations, determining that at least the version of the application is available can be done in a privacy-preserving operation in which the device sends a hash of the decoded network identifier, a portion of a hash of the entire decoded network identifier (e.g., a prefix of a full hash of the decoded network identifier), or a hash of a portion of the decoded network identifier to the server 120. The server 120 looks up a set or a "bucket" of information including application identifiers, resource identifiers, and/or application clip identifiers that correspond to that hash (e.g., the hashing algorithm may be designed to have multiple different decoded network identifiers or portions thereof that hash to the same value) and then sends back the bucket of information including the identifiers of available versions of the applications and/or identifiers of the applications (e.g., and decoded network identifiers or portions thereof that are associated with those identifiers in the bucket). The device may then determine locally whether an application and/or one or more versions of the application associated with the decoded network identifier, and/or an identifier associated with the application and/or one or more versions of the application, are included and/or identified in the bucket. If one or more versions of the application associated with the decoded network identifier are included and/or identified in the bucket, the electronic device downloads, installs, and/or launches the version(s) of the application. In this way, the device can identify versions of an application that are available, while avoiding, for example, revealing the location of the device or browsing or other activity of the user to the server until the user authorizes installation of the application/version.

The present disclosure recognizes that the use of such personal information data, in the present technology, can be used to the benefit of users. For example, the personal information data can be used for encoding and/or decoding network identifiers, and/or accessing associated resources that may be associated with a on a user's location, a user's preferences, a user's activity, and/or crowd-sourced information for the user or other users.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of encoding and/or decoding network identifiers and/or accessing associated resources, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
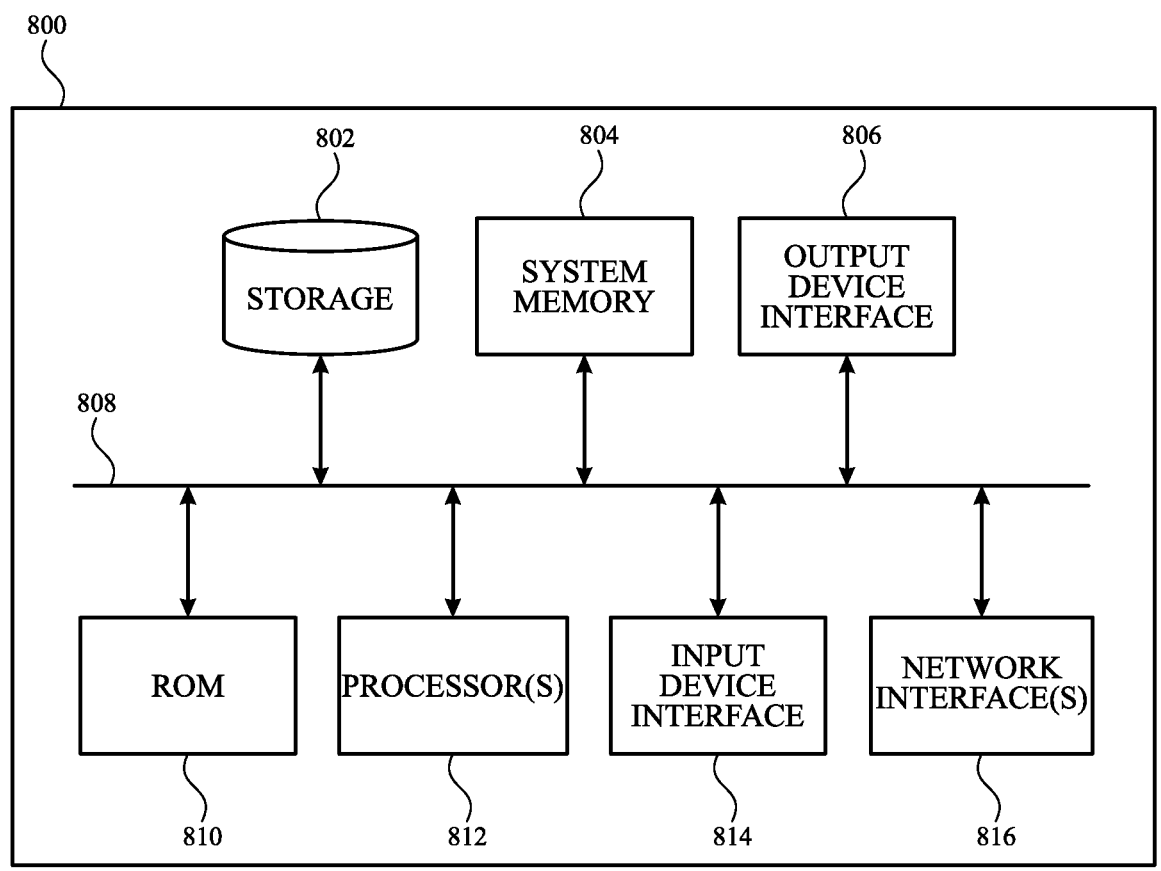
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 110, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

In accordance with aspects of the disclosure, a method is provided that includes receiving a network identifier having an associated length defined by a number of characters in the network identifier; encoding the characters of the network identifier to generate an encoded network identifier, where the encoded network identifier includes fewer characters than the number of characters in the network identifier, and providing the encoded network identifier for access, by an end user electronic device that is configured to decode the encoded network identifier, to information associated with the network identifier. Encoding the characters of the network identifier includes encoding a domain of the network identifier without adding domain information for any domain other than the domain of the network identifier; encoding a host of the network identifier using a first set of encoding operations; and encoding a path of the network identifier using a second set of encoding operations different from the first set of encoding operations.

In accordance with aspects of the disclosure, a method is provided that includes obtaining an encoded network identifier corresponding to a network identifier that includes a host, a domain, and a path, the encoded network identifier comprising a plurality of characters; determining, from the encoded network identifier, a host encoding scheme for the host; determining, from the encoded network identifier, a path encoding scheme for the path; decoding a first portion of the characters of the encoded network identifier based on the host encoding scheme to obtain the host and the domain; decoding a second portion of the characters of the encoded network identifier based on the path encoding scheme to obtain the path; and accessing a resource corresponding to the network identifier using the decoded host, domain, and path.

In accordance with aspects of the disclosure, a non-transitory machine-readable medium is provided that stored instructions which, when executed by a processor, cause the processor to receive a network identifier having an associated length defined by a number of characters in the network identifier; encode the characters of the network identifier to generate an encoded network identifier, where the encoded network identifier includes fewer characters than the number of characters in the network identifier; and provide the encoded network identifier for access, by an end user electronic device that is configured to decode the encoded network identifier, to information associated with the network identifier. Causing the processor to encode the characters of the network identifier includes causing the processor to: encode a domain of the network identifier without adding domain information for any domain other than the domain of the network identifier; encode a host of the network identifier using a first set of encoding operations; and encode a path of the network identifier using a second set of encoding operations different from the first set of encoding operations.

In accordance with aspects of the disclosure, a method is provided that includes receiving a network identifier including a string of characters; encoding the characters of the network identifier to generate an encoded network identifier; and providing the encoded network identifier for access, by an end user electronic device that is configured to decode the encoded network identifier, to information associated with the network identifier. Encoding the characters of the network identifier includes encoding the characters of a domain of the network identifier; encoding a host of the network identifier using a first set of encoding operations; and encoding a path of the network identifier using a second set of encoding operations different from the first set of encoding operations.

In accordance with aspects of the disclosure, a non-transitory machine-readable medium is provided that stored instructions which, when executed by a processor, cause the processor to receive a network identifier having a plurality of characters; encode the characters of the network identifier to generate an encoded network identifier, where causing the processor to encode the characters of the network identifier comprises causing the processor to encode the characters of a domain of the network identifier, encode a host of the network identifier using a first set of encoding operations, and encode a path of the network identifier using a second set of encoding operations different from the first set of encoding operations; and provide the encoded network identifier for access, by an end user electronic device that is configured to decode the encoded network identifier, to information associated with the network identifier.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
receiving a network identifier including a string of characters; and
encoding the characters of the network identifier to generate an encoded network identifier, wherein encoding the characters of the network identifier comprises:
encoding a path of the network identifier using a first encoding scheme;
determining that the network identifier has a format that matches a template format;
encoding the path of the network identifier using a second encoding scheme responsive to determining that the network identifier has the format that matches the template format;
selecting one of the encodings of the path from the first encoding scheme or the second encoding scheme; and
providing the encoded network identifier including the selected one of the encodings of the path.

2. The method of claim 1, wherein determining that the network identifier has the format that matches the template format comprises determining that the network identifier has a predetermined subdomain.

3. The method of claim 2, wherein determining that the network identifier has the format that matches the template format further comprises determining that the path of the network identifier includes a word that is included in a word table index for the template format.

4. The method of claim 3, wherein encoding the path of the network identifier using the second encoding scheme comprises encoding the network identifier using a template encoding scheme.

5. The method of claim 4, wherein encoding the network identifier using the template encoding scheme comprises encoding the predetermined subdomain using a single bit.

6. The method of claim 5, wherein encoding the network identifier using the template encoding scheme further comprises encoding the path using a fixed-length index corresponding to an entry in a word table index for the template format.

7. The method of claim 1, further comprising encoding a host of the network identifier using a set of encoding operations different from the first encoding scheme and the second encoding scheme.

8. The method of claim 1, wherein the first encoding scheme comprises:
concatenating at least the path and a query of the network identifier; and
compressing the concatenated at least the path and query using multi-context encoding.

9. A method, comprising:
obtaining, by an application running at an electronic device, an image from a camera of the electronic device;
obtaining, by the application, a code from the image;
extracting, by the application based on the code, an encoded network identifier;
determining, by the application, that the encoded network identifier has been encoded using a template encoding scheme;
decoding, by the application responsive to determining that the encoded network identifier has been encoded using the template encoding scheme, the encoded network identifier according to a template decoding scheme to obtain a decoded network identifier; and
accessing, by the application, a resource corresponding to the decoded network identifier.

10. The method of claim 9, wherein determining that the encoded network identifier has been encoded using a template encoding scheme comprises determining that the encoded network identifier includes a first bit indicating the template encoding scheme.

11. The method of claim 10, wherein decoding the encoded network identifier according to the template decoding scheme comprises obtaining a predefined subdomain for the decoded network identifier according to a second bit of the encoded network identifier.

12. The method of claim 11, wherein decoding the encoded network identifier according to the template decoding scheme further comprises obtaining a path of the decoded network identifier from a word table index.

13. The method of claim 12, wherein obtaining the path of the decoded network identifier from a word table index comprises obtaining a word from the word table index using a fixed-length index in the encoded network identifier that corresponds to an entry in the word table index.

14. The method of claim 13 wherein decoding the encoded network identifier according to the template decoding scheme further comprises:
  obtaining a host bit from the encoded network identifier; and
  decoding a host of the encoded network identifier using a host decoding operation determined using the host bit.

15. The method of claim 9, wherein the application comprises a browser application.

16. A method, comprising:
  obtaining, by an application running at an electronic device, an image from a camera of the electronic device;
  obtaining, by the application, a code from the image;
  extracting, by the application based on the code, an encoded network identifier corresponding to a network identifier comprising a host, a domain, and a path, the encoded network identifier comprising a plurality of characters;
  determining, by the application from the encoded network identifier, a host encoding scheme for the host;
  determining, by the application from the encoded network identifier, a path encoding scheme for the path;
  decoding, by the application, a first portion of the characters of the encoded network identifier based on the host encoding scheme to obtain the host and the domain;
  decoding, by the application, a second portion of the characters of the encoded network identifier based on the path encoding scheme to obtain the path; and
  accessing, by the application, a resource corresponding to the network identifier using the host, domain, and path.

17. The method of claim 16, wherein determining the host encoding scheme for the host comprises determining, based on a host bit in the encoded network identifier, whether the domain and a top level domain of the host are encoded differently.

18. The method of claim 16, wherein determining the path encoding scheme for the path comprises determining, based on a segmentation bit in the encoded network identifier, whether the path is encoded together with a query of the network identifier.

19. The method of claim 16, wherein determining the path encoding scheme for the path comprises determining, based on a template bit in the encoded network identifier, whether the path encoding scheme is a template encoding scheme.

20. The method of claim 16, wherein the application comprises a browser application.

\* \* \* \* \*

UNITED STATES PATENT AND TRADEMARK OFFICE
CERTIFICATE OF CORRECTION

| | | |
|---|---|---|
| PATENT NO. | : 11,750,557 B2 | Page 1 of 1 |
| APPLICATION NO. | : 17/826155 | |
| DATED | : September 5, 2023 | |
| INVENTOR(S) | : Reza Abbasian et al. | |

It is certified that error appears in the above-identified patent and that said Letters Patent is hereby corrected as shown below:

On the Title Page

Item (57) Column 2, Line 3:
"identifier to a another server"
Should read:
--identifier to another server--

Signed and Sealed this
Second Day of January, 2024

Katherine Kelly Vidal
*Director of the United States Patent and Trademark Office*